United States Patent
Kahan et al.

(10) Patent No.: US 7,877,746 B2
(45) Date of Patent: Jan. 25, 2011

(54) PERSONALIZED INSTALLATION FILES

(75) Inventors: Ariel Yehoshua Kahan, Jerusalem (IL); Gideon Greenspan, Tel Aviv (IL); Akiba Asher Hofmann, Modi'in (IL); David G. M. Jacobson, D.N. HaEla (IL); David Elliot Goldfarb, Bet Shemesh (IL); Andrew Goldman, Bet Shemesh (IL)

(73) Assignee: Vringo Inc., New York, NY (US)

( * ) Notice: Subject to any disclaimer, the term of this patent is extended or adjusted under 35 U.S.C. 154(b) by 0 days.

(21) Appl. No.: 11/858,193

(22) Filed: Sep. 20, 2007

(65) Prior Publication Data

US 2008/0077915 A1    Mar. 27, 2008

Related U.S. Application Data

(60) Provisional application No. 60/846,113, filed on Sep. 21, 2006.

(51) Int. Cl.
*G06F 9/445* (2006.01)

(52) U.S. Cl. .................. 717/178; 717/168; 717/173; 717/174

(58) Field of Classification Search .......... 717/168–178
See application file for complete search history.

(56) References Cited

U.S. PATENT DOCUMENTS

| | | | |
|---|---|---|---|
| 5,822,565 A * | 10/1998 | DeRosa et al. ............ 703/24 |
| 5,963,743 A * | 10/1999 | Amberg et al. ............ 717/174 |
| 6,167,567 A * | 12/2000 | Chiles et al. ............. 717/173 |
| 6,442,573 B1 * | 8/2002 | Schiller et al. ............ 715/210 |
| 6,512,924 B2 * | 1/2003 | Sawada et al. ........... 455/435.1 |
| 6,573,907 B1 * | 6/2003 | Madrane .................. 715/719 |
| 6,606,744 B1 * | 8/2003 | Mikurak ................... 717/174 |
| 6,671,818 B1 * | 12/2003 | Mikurak ................... 714/4 |
| 6,760,748 B1 * | 7/2004 | Hakim ..................... 709/204 |
| 6,944,185 B2 * | 9/2005 | Patki et al. ................ 370/474 |
| 6,970,928 B2 * | 11/2005 | Ihara et al. ................ 709/226 |
| 7,010,601 B2 * | 3/2006 | Yoshimine et al. ......... 709/226 |
| 7,062,765 B1 * | 6/2006 | Pitzel et al. ............... 717/177 |
| 7,110,982 B2 * | 9/2006 | Feldman et al. ............ 705/51 |
| 7,124,101 B1 * | 10/2006 | Mikurak ................... 705/35 |
| 7,130,807 B1 * | 10/2006 | Mikurak ................... 705/7 |
| 7,246,169 B2 * | 7/2007 | Yoshimine et al. ......... 709/228 |
| 7,281,035 B2 * | 10/2007 | Ihara et al. ................ 709/219 |
| 7,310,821 B2 * | 12/2007 | Lee et al. .................. 726/27 |

* cited by examiner

*Primary Examiner*—Lewis A Bullock, Jr.
*Assistant Examiner*—Michael Yaary
(74) *Attorney, Agent, or Firm*—AlphaPatent Associates Ltd.; Daniel J. Swirsky

(57) ABSTRACT

A method includes personalizing a software installation file. The personalizing includes providing the file with a unique identifier included as part of a file name associated with the file. Another method includes installing a software application from the personalized installation file, extracting the indication from the file name and using the indication to personalize the software application.

17 Claims, 4 Drawing Sheets

PERSONALIZED INSTALLATION FILES

CROSS-REFERENCE TO RELATED APPLICATIONS

This application claims benefit from U.S. Provisional Patent Application No. 60/846,113, filed Sep. 21, 2006, which is hereby incorporated in its entirety by reference.

FIELD OF THE INVENTION

The present invention relates to software installation files generally and to their personalization in particular.

BACKGROUND OF THE INVENTION

Software installation files are known in the art. Such files are used to install and/or setup software applications for use by an end user. Installation files are typically "self-extractors." A self-extracting file is an executable file comprising one or more compressed files and the instructions required to extract and setup the compressed file(s) as an executable software application.

FIG. 1A illustrates an example of a typical self extracting installation file 1. Installation file 1 comprises a setup program 2 and possibly compressed program files 5. Compressed program files 5 comprise a number of individual files required to run a software application. Setup program 2 comprises the logic required to set up these files for use.

When installation file 1 is executed, setup program 2 is extracted as setup program 2'. Setup program 2' is then launched to continue the installation and set up of the software application. It extracts each of compressed program files as program files 5' and typically interacts with the operating system to provide the end user with means to run the newly installed application. Examples of typical program files include: executable files (EXE), dynamic link libraries (DLLs), database files (DBF) and help files (HLP).

There are also non self-extracting installation files. These installation files typically have instructions on where to find the files to install; for example, on a CD or at a URL.

There are also one-level installations. In such installations, the functionality of setup program 2' is included in installation file 1; there is no need to extract a separate executable program to continue and complete the installation process.

Installation files are sometimes personalized or customized with information pertaining to a specific end user. For example, data such as the user's name and/or account information may be included along with the software application. Such personalization is typically accomplished by entering the relevant data at the time of purchase and compiling a personal installation file for the specific user.

FIG. 1B illustrates an example of a typical personalized installation file 1. Similar to FIG. 1A, installation file 1 comprises a setup program 2 and compressed program files 5 which are then extracted as setup program 2' and program files 5'. However, installation file 1 may also comprise personalization data 3. After personalization data 3 is extracted as personalization data 3', setup program 2 uses this data to personalize some or all of program files 5' for a particular user and/or installation.

Some operating systems, such as recent versions of the Symbian operating system for mobile devices, require an application to be "signed" in order to allow it to run and/or access certain system functionality. Signed applications are typically tested for stability and functional accuracy in order to ensure that they conform to expected standards of behavior for a given environment.

A signed application includes a "digital signature" that is used by the operating system to authorize the use of system resources by an application. Such digital signatures typically include logic to check whether or not the application's installation package and contents have been modified subsequent to the signing process. Accordingly, if an application or any of its included files have been modified, it will typically require retesting and re-signing before it can be distributed and used.

The testing/re-signing process typically requires a non-trivial investment of time and resources. Signed installation files are therefore usually not personalized by compilation.

SUMMARY OF THE PRESENT INVENTION

There is provided, in accordance with a preferred embodiment of the present invention, a method including personalizing a software installation file. The personalizing includes providing the file with a unique identifier included as part of a file name associated with the file.

Additionally, in accordance with a preferred embodiment of the present invention, the method also includes storing personalization details associated with the identifier and providing the details in response to a request including the identifier.

Further, in accordance with a preferred embodiment of the present invention, the method also includes enabling a user to input the personalization details on behalf of an invitee and sending an invitation to download the personalized installation file to the invitee.

Moreover, in accordance with a preferred embodiment of the present invention, the invitation is an SMS.

Additionally, in accordance with a preferred embodiment of the present invention, the providing includes downloading the file to a mobile phone.

Further, in accordance with a preferred embodiment of the present invention, the identifier is a telephone number for the mobile phone. Alternatively, the identifier is a representation of an email address.

Moreover, in accordance with a preferred embodiment of the present invention, the installation file is signed.

There is also provided, in accordance with a preferred embodiment of the present invention, a system including a registrar and a downloader. The registrar registers personalization details and the downloader provides the installation file described hereinabove.

Additionally, in accordance with a preferred embodiment of the present invention, the system also includes a personalization database to store the details and a personalizer to provide the details when receiving a request having the indication.

Moreover, in accordance with a preferred embodiment of the present invention, the system also includes an inviter to invite a user to download the installation file.

Further, in accordance with a preferred embodiment of the present invention, the inviter includes an SMS sender to send an SMS to a mobile device of the invitee.

There is also provided, in accordance with a preferred embodiment of the present invention, a method including installing a software application from a personalized installation file, wherein a name for the file includes at least an indication of personalization details, extracting the indication from the file name and using the indication to personalize the software application.

Moreover, in accordance with a preferred embodiment of the present invention, the method includes receiving an invitation to download the installation file, wherein the invitation is extended by an initiator providing the personalization details.

Further, in accordance with a preferred embodiment of the present invention, the receiving includes receiving an SMS including at least the indication of the personalization details.

Still further, in accordance with a preferred embodiment of the present invention, the using includes requesting the personalization details using the indication.

Finally, there is provided, in accordance with a preferred embodiment of the present invention, a computer product readable by a machine, tangibly embodying a program of instructions executable by the machine to perform method steps for installing a software application. The method steps include installing a software application from a personalized installation file, wherein a name for the file includes at least an indication of personalization details, extracting the indication from the file name, and using the indication to personalize the software application.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1A:
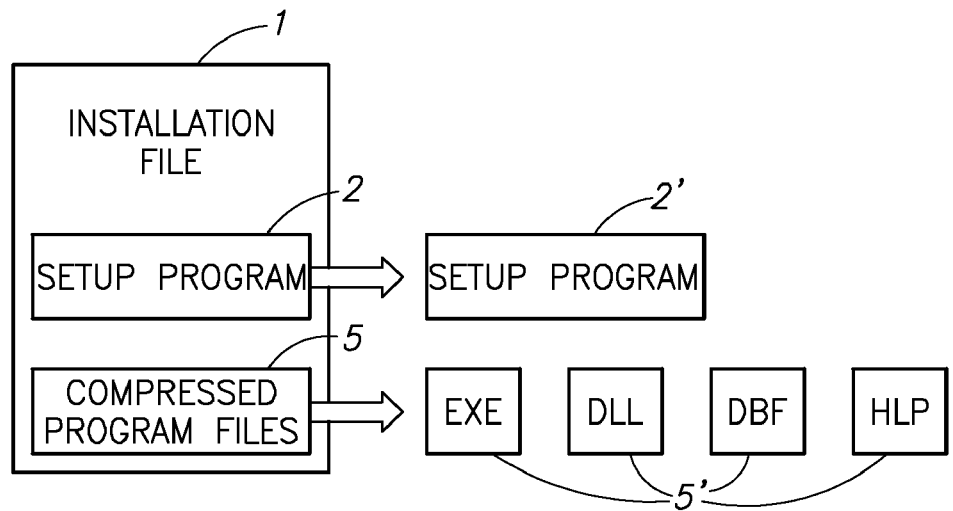
FIGS. 1A and 1B are schematic illustrations of self extracting installation files.
Figure 1B:
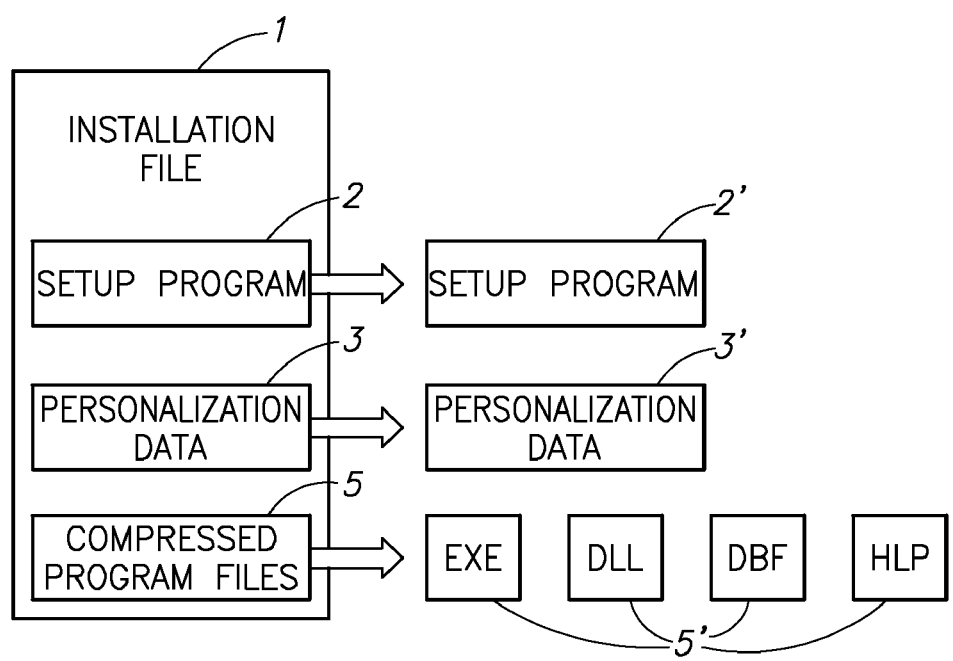

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2:
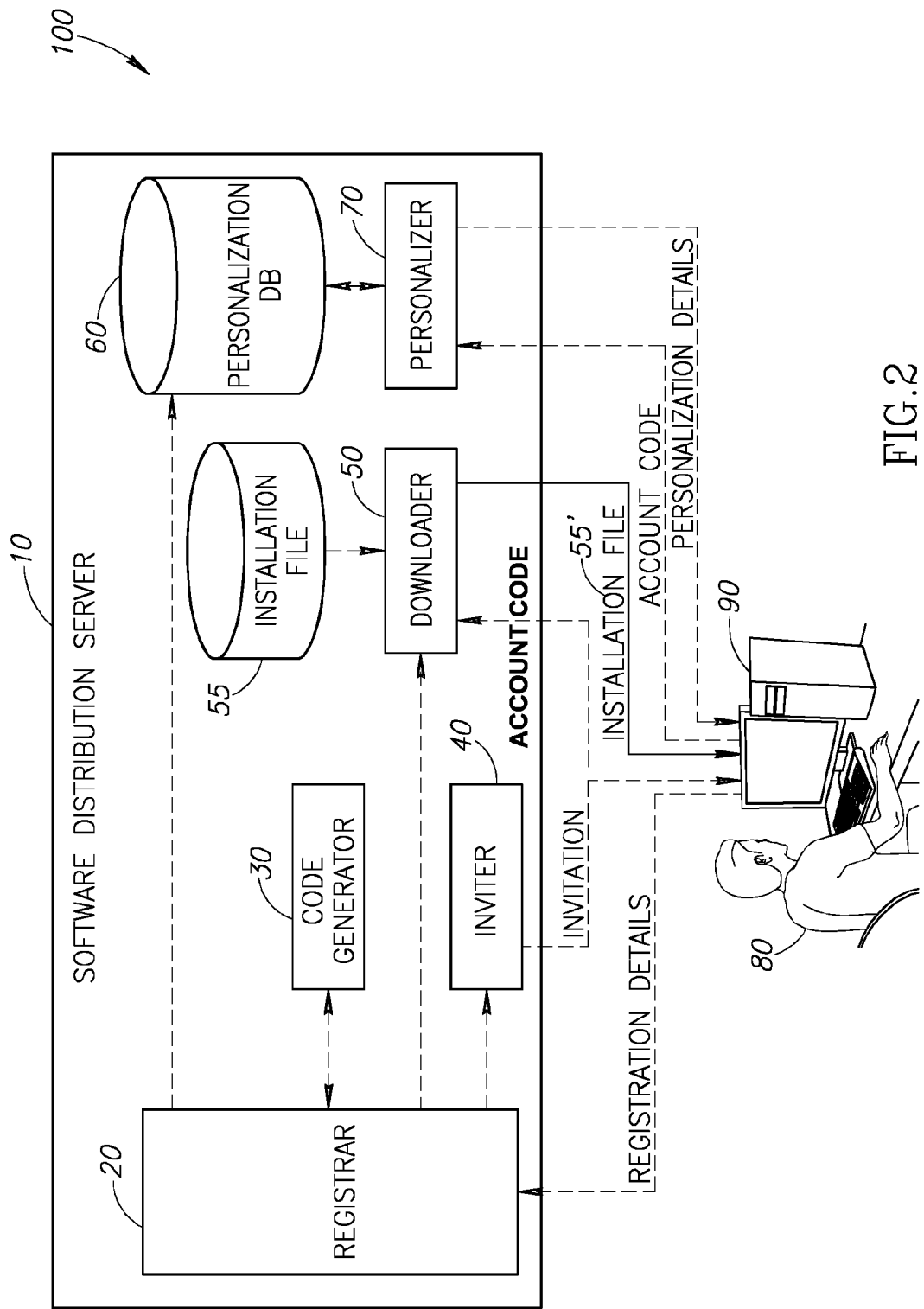
FIG. 2 is a schematic illustration of a system for the personalization of installation files, constructed and operative in accordance with a preferred embodiment of the present invention.

The present invention may be a novel system and method for the personalization of installation files. FIG. 2, to which reference is now made, illustrates a software installation file personalization system 100, constructed and operative in accordance with a preferred embodiment of the present invention. System 100 may personalize software installation files by adding a unique account code as part of the file name.

System 100 may comprise a software distribution server 10 and at least one personal computing device 90 used by a user 80. Server 10 and computing device 90 may communicate with each other via any suitable communications network, such as the Internet. As will be described hereinbelow, server 10 may provide a personalized installation file for installation on computing device 90.

It will be appreciated that the use of computing device 90 is exemplary. Computing device 90 may be replaced by any suitable device that may be capable of communicating with server 10, downloading software, and running that software, such as a desktop computer, a laptop, a mobile device, a PDA (personal data assistant), a telephone, etc.

Software distribution server 10 may comprise a registrar 20, a code generator 30, an inviter 40, a downloader 50, a personalization database 60 and a personalizer 70. Server 10 may be accessed by user 80 to download a personalized installation file for a given software application.

Registrar 20 may receive registration details from user 80. Such details may comprise, for example, a username, an email address, a phone number, and the operating system installed on computing device 90. An account code may be generated for this registration by code generator 30. It will be appreciated that this account code may be unique, and may therefore be used to uniquely identify the associated registration details. Registrar 20 may update personalization database 60 with the account code and associated registration details.

Registrar 20 may also forward the account code and relevant registration details to inviter 40. Inviter 40 may send an invitation which may include the account code, to user 80. The invitation may be sent in any suitable manner, such as by email or SMS.

Downloader 50 may receive a download request from computing device 90. It will be appreciated that the download request may comprise the unique account code as generated by registrar 20. Downloader 50 may comprise means to prepare a unique download file name for an installation file 55. Such means may comprise any suitable tools, such as php on an Apache Web Server (standardly available on most Linux distributions today). For example, installation file 55 may be named "INSTALL.EXE". Downloader 50 may download file 55 as an installation file 55' named "INSTALL USER1.EXE", where "USER1" is the account code for user 80.

Optionally, personalizer 70 may receive a personalization request from computing device 90. The personalization request may comprise the account code (for example, "USER1"). As will be described hereinbelow, the personalization request may have been generated by executing a personalized installation file.

Personalizer 70 may use the account code to lookup the associated registration detail in personalization database 60 and to return them to computing device 90. It will be appreciated that as described hereinbelow, these registration details may then be input to an install/setup process that may use the details to personalize a newly installed software application without requiring a user to input them manually or otherwise.

It will also be appreciated that the entire process described hereinabove may be carried out while using a single Internet connection between computing device 90 and server 10. Alternatively, the process may be carried out over time and may involve a multiplicity of physical connections.

In accordance with a preferred embodiment of the present invention, computing device 90 may initiate registration on server 10. It will be appreciated that as described hereinabove, registration may include the entry of personalization details such as a username, an email address, a phone number, and the operating system installed on computing device 90.

Computing device 90 may receive an invitation from inviter 40. The invitation may include an account code generated on behalf of the details entered during registration. The invitation may also include a URL or instructions for accessing downloader 50 to download a copy of installation file 55.

Computing device 90 may access downloader 50 and may receive a downloaded copy of installation file 55, heretofore referred to as installation file 55'. It will be appreciated that as described hereinabove, the name of installation file 55' may include the account code generated on behalf of the details entered during registration.

Computing device 90 may start installation of the downloaded installation file. It will be appreciated that installation may be started automatically as part of the download process, or it may initiated by user 80.

Figure 3:
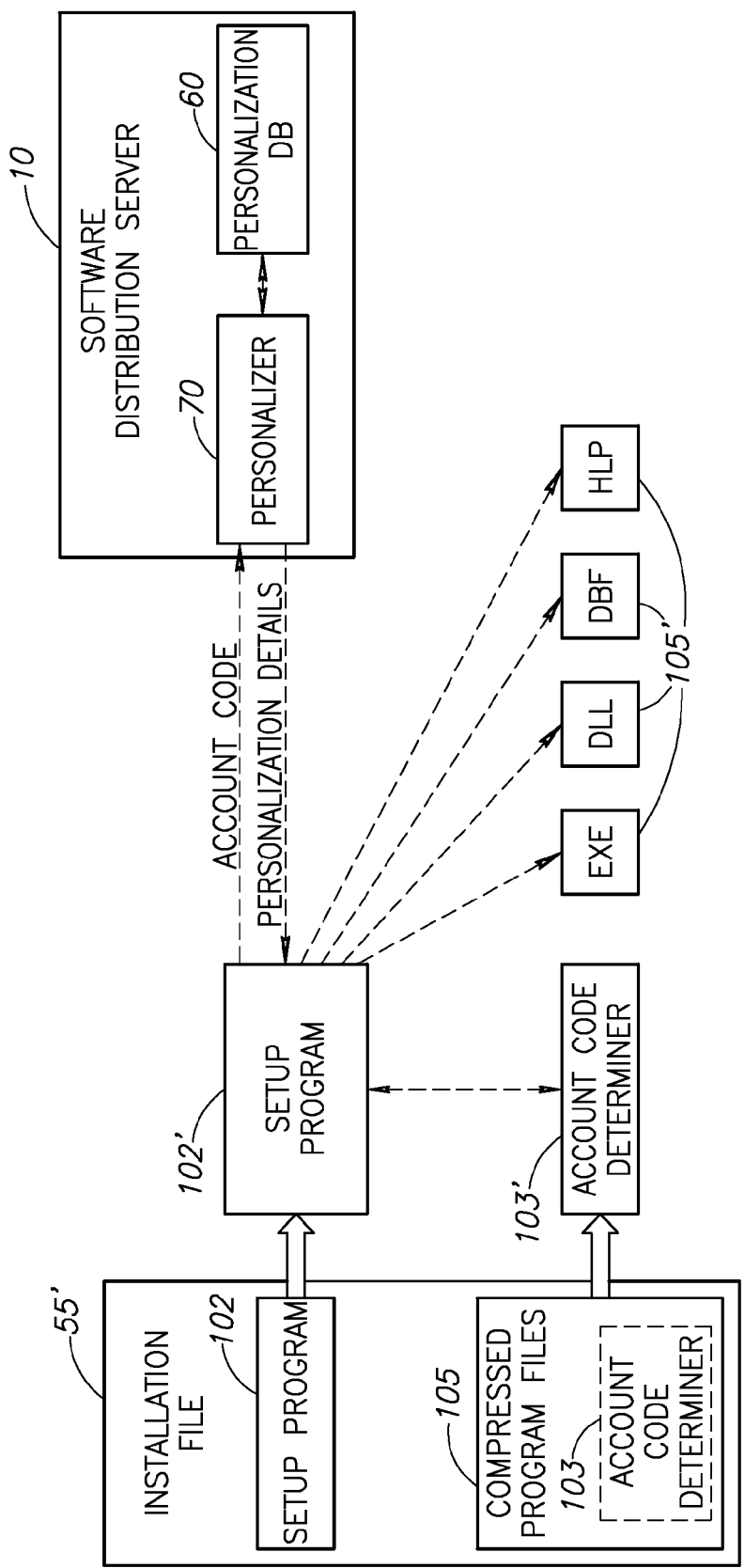
FIG. 3 is a schematic illustration of a personalized installation file, constructed and operative in accordance with a preferred embodiment of the present invention.

FIG. 3, to which reference is now also made, illustrates an exemplary installation file 55' as it may operate within the context of system 100. Installation file 55' may comprise a setup program 102, and compressed program files 105. As in the prior art, compressed program files 105 may comprise one or more compressed files that may be required to install and setup a software application. However, compressed program files 105 may also comprise account code determiner 103. These components may be extracted as setup program 102', account code determiner 103' and program files 105'. It will be appreciated that account code determiner 103 may also operate as a non-extracted component of installation file 55'. The functionality of account code determiner 103' may also be incorporated within setup program 102' or within one of program files 105'.

Account code determiner 103' may determine an associated account code by examining the file name of installation file 55' and by identifying any changes from a default name for installation file 55. As per the example described hereinabove, installation file 55' may be named "INSTALL USER1.EXE". Accordingly, account code determiner 103' may determine that the associated account code may be "USER1".

It will be appreciated that the download process may include selection and/or confirmation of the physical name and directory location where installation file 55' may be saved. Furthermore the setup process run by setup program 102' may also include selection and/or confirmation of the physical name(s) and directory location(s) where installation file 55' may run and set up its component program files. Accordingly, it may be assumed that account code determiner may have means to access a relevant file name for analysis.

Setup program 102' may access personalizer 70 with the account code determined by account code determiner 103'. Setup program 102' may receive, in return, personalization details from personalizer 70. It will be appreciated that as described hereinabove, these details may have originally been entered during registration.

Setup program 102' may use the personalization details received from personalizer 70 to personalize the software application represented by program files 105'.

In accordance with an alternative preferred embodiment of the present invention, setup program 102' may use the account code itself to personalize the software application. For example, the account code may be a phone number used by user 80, or a representation of an email address. In such cases, the account code itself may then be used to personalize the application without looking up associated details in personalization database 60.

It will be appreciated that the present invention as described hereinabove provides a method for the personalization of installation files without recompilation. Furthermore, this method does not modify the contents of a downloaded file, and accordingly is appropriate for use with signed applications.

Figure 4:
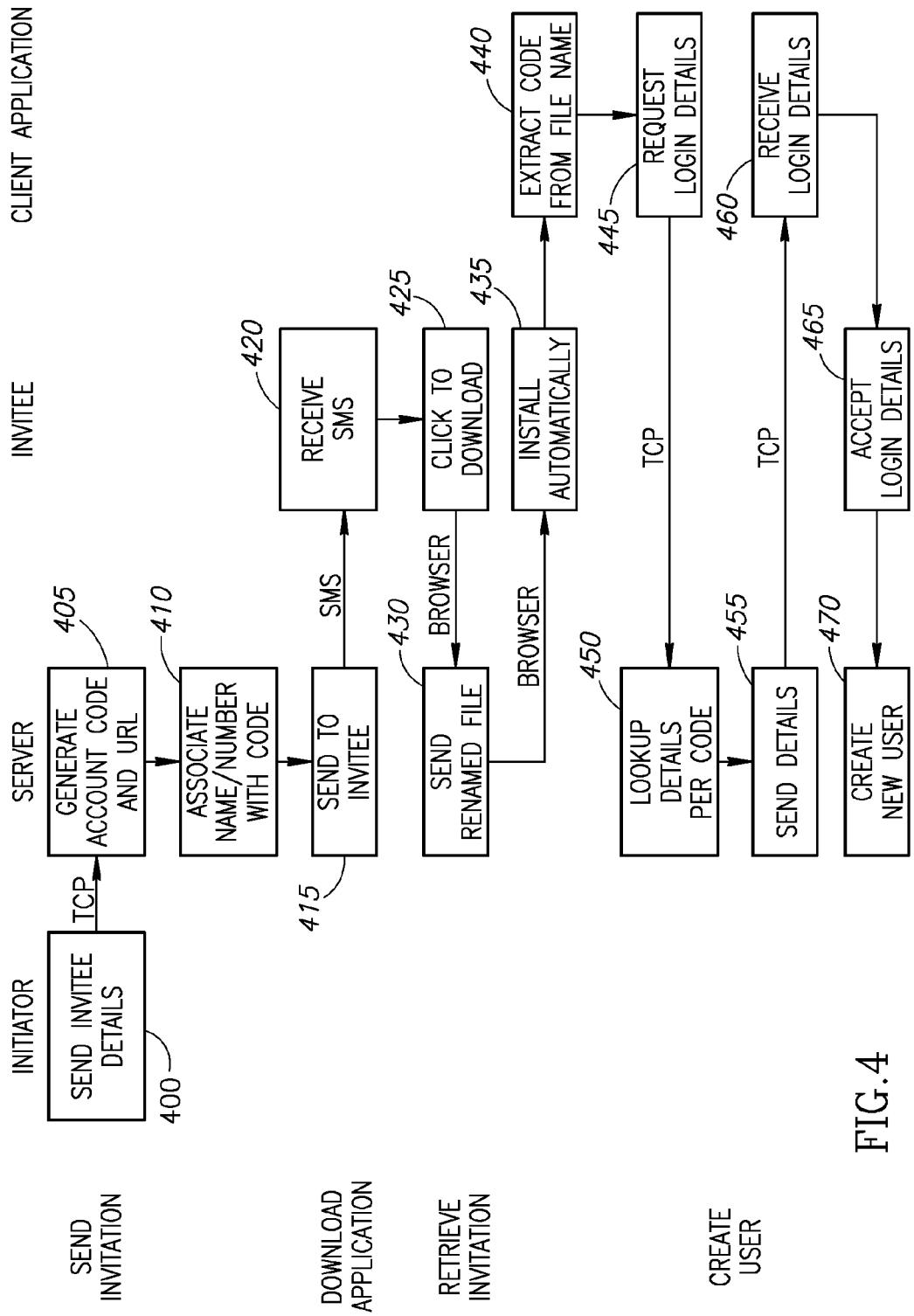
FIG. 4 is a flow chart illustrating the flow of control between the various entities included in the system of FIG. 1 in accordance with another preferred embodiment of the present invention.

FIG. 4, to which reference is now made, illustrates the flow of control between the various entities in an alternative embodiment of system 100. The first column lists the various processing stages, and the other four columns illustrate the processing performed by an initiator, a server, an invitee, and a client application on an invitee communication device, respectively.

The initiator may wish to invite the invitee to download and use a software application for use on a communication device. Users of the software may need to create users on the server before they may use the software. Creating a user may, for example, require the entry of user details such as a user's name and a phone number for the communication device. The initiator may send (step 400) the invitee's details to the server in order to initiate sending an invitation to the invitee.

The server may generate (step 405) an account code and URL for the invitee. The URL may indicate the location of an installation file to be downloaded by the invitee. The server may also associate (step 410) the name and phone number with the generated account code. The server may send (step 415) an SMS (using the number supplied by the initiator) with an invitation to download the software to the invitee's communication device. The SMS may include the URL generated in step 405.

The invitee may receive (step 420) the SMS, and then may click (step 425) on the URL to initiate the download, thus opening a browser session with the server. The server may send (step 430) the invitee an installation file renamed to include the account code generated in step 405. The installation file may be configured to install (step 435) automatically on the invitee communication device.

A client application installed by step 435 may extract (step 440) the account code from the name of the installation file and, using the extracted code for identification, may request (step 445) login details from the server via a connection, such as a TCP connection. The server may use the code to lookup (step 450) the invitee's details (as supplied by the initiator in step 400) and send (step 455) the located details back to the invitee.

The client application may receive (step 460) the details from the server. When the invitee may accept (step 465) the details, the server may use them to create a new user on behalf of the invitee.

It will be appreciated that personalizing an installation file may simplify the user creation and login processes for a new user. An invitee may not have to enter any identifying information during installation; it may be provided by an initiator and then it may be confirmed by the invitee. It will further be appreciated that it may be easier for an initiator to enter such information. For example, the initiator may have access to a full keyboard, whereas the invitee may only have access to a numeric keypad such as are commonly used on mobile telephones. Furthermore, the initiator may actually understand the registration process better, having previously become familiar with the software being downloaded.

It will also be appreciated that the embodiment described by FIG. 4 may be exemplary. Other configurations of system 100 are possible as well. For example, the initiator and the invitee may be the same person; it may be more convenient for the initiator to provide the relevant details at the beginning of the process instead of the end.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
   personalizing a software installation file for a software application for use by a specific individual, wherein said personalizing comprises:
   maintaining an unmodified, already compiled, standard software installation file;
   generating a unique identifier that indicates customized software functionality associated with said specific individual;
   naming said already compiled standard software installation file with a filename that includes said unique identifier to produce a personalized software installation file without recompiling said software installation file; and
   downloading said personalized software installation file to a device associated with said specific individual,
   wherein said personalized software installation file comprises means to extract said unique identifier from said filename and to personalize said software application during installation with said indicated customized functionality.

2. The method according to claim 1 and also comprising:
   storing personalization details associated with said identifier; and
   providing said details in response to a request including said identifier.

3. The method according to claim 2 and also comprising:
   enabling a user to input said personalization details on behalf of an invitee; and
   sending an invitation to download said personalized installation file to said invitee.

4. The method according to claim 3 and wherein said invitation is an SMS.

5. The method according to claim 1 and wherein said providing comprises downloading said file to a mobile phone.

6. The method according to claim 5 and wherein said identifier is a telephone number for said mobile phone.

7. The method according to claim 1 and wherein said identifier is a representation of an email address.

8. The method according to claim 1 and wherein said installation file is signed.

9. A system comprising:
   a registrar to register personalization details associated with a specific individual and to generate a unique identifier indicating customized software functionality associated with said specific individual; and
   a downloader comprising:
   a storage unit to maintain an unmodified already compiled software installation file for a software application,
   a generator to generate a personalized installation file by renaming a filename of said software installation file to include said unique identifier without recompiling said software installation file, and
   a downloading unit to download said personalized installation file to a device associated with said specific individual,
   wherein said personalized installation file comprises means to extract said unique identifier from said filename and to personalize said software application during installation with said indicated customized functionality.

10. The system according to claim 9 and also comprising:
    a personalization database to store said details; and
    a personalizer to provide said details when receiving a request having said indication.

11. The system according to claim 9 and also comprising an inviter to invite a user to download said installation file.

12. The system according to claim 11 and wherein said inviter comprises an SMS sender to send an SMS to a mobile device of said invitee.

13. A method comprising:
    activating a standard compiled installation file, said file comprising personalization means and means for installing a software application, wherein a name assigned to said file after compilation includes at least an indication of customized software functionality associated with a specific individual;
    said personalization means extracting said indication from said file name; and
    said personalization means using said indication to personalize said software application during installation with said customized software functionality for use by said specific individual.

14. The method according to claim 13 and comprising:
    receiving an invitation to download said installation file, wherein said invitation is extended by an initiator providing said personalization details.

15. The method according to claim 14 and wherein said receiving comprises receiving an SMS including at least said indication of said personalization details.

16. The method according to claim 13 and wherein said using comprises:
    requesting said personalization details using said indication.

17. A computer product readable by a machine, tangibly embodying a program of instructions executable by the machine to perform method steps for installing a software application, said method steps comprising:
    activating a standard compiled installation file, said file comprising personalization means and means for installing a software application, wherein a name assigned to said file after compilation includes at least an indication of customized software functionality associated with a specific individual;
    said personalization means extracting said indication from said file name; and
    said personalization means using said indication to personalize said software application during installation with said customized software functionality for use by said specific individual.

* * * * *